(12) United States Patent
Poorchandran et al.

(10) Patent No.: US 10,749,815 B2
(45) Date of Patent: Aug. 18, 2020

(54) TECHNOLOGIES FOR CONTEXT-AWARE DYNAMIC BANDWIDTH ALLOCATION

(71) Applicant: Intel Corporation, Santa Clara, CA (US)

(72) Inventors: Rajesh Poorchandran, Portland, OR (US); Mats Agerstam, Portland, OR (US); Karthik Veeramani, Hillsboro, OR (US); Katalin Bartfai-Walcott, El Dorado Hills, CA (US); Rajneesh Chowdhury, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 16/023,792

(22) Filed: Jun. 29, 2018

(65) Prior Publication Data

US 2019/0044882 A1 Feb. 7, 2019

(51) Int. Cl.
*H04L 12/927* (2013.01)
*H04L 12/813* (2013.01)
*H04L 12/873* (2013.01)
*H04L 12/851* (2013.01)
*H04L 12/859* (2013.01)

(52) U.S. Cl.
CPC .......... *H04L 47/805* (2013.01); *H04L 47/20* (2013.01); *H04L 47/2475* (2013.01); *H04L 47/2483* (2013.01); *H04L 47/52* (2013.01); *H04L 47/80* (2013.01); *H04L 47/803* (2013.01); *H04L 47/808* (2013.01)

(58) Field of Classification Search
None
See application file for complete search history.

(56) References Cited

U.S. PATENT DOCUMENTS

| 2008/0062988 | A1* | 3/2008 | Daigle | H04L 12/14 370/392 |
| 2008/0310301 | A1* | 12/2008 | Wade, Jr. | H04L 47/245 370/230 |
| 2015/0281277 | A1* | 10/2015 | May | H04L 63/10 726/1 |
| 2017/0250892 | A1* | 8/2017 | Cooper | G06F 21/44 |

* cited by examiner

*Primary Examiner* — James P Duffy
(74) *Attorney, Agent, or Firm* — Barnes & Thornburg LLP

(57) ABSTRACT

Technologies for context-aware dynamic bandwidth allocation include a network compute device configured to collect context inputs from a plurality of compute devices communicatively coupled to the network compute device. The network compute device is further configured to identify a context of each compute device based on the collected context inputs and determine a bandwidth priority for each compute device based on the identified context. Additionally, the network compute device is configure to determine an amount of bandwidth from a total available bandwidth to allocate to the compute device based on the determined bandwidth priority and update a moderated bandwidth allocation policy to reflect the determined amount of bandwidth allocated to the compute device. Other embodiments are described herein.

23 Claims, 5 Drawing Sheets

TECHNOLOGIES FOR CONTEXT-AWARE DYNAMIC BANDWIDTH ALLOCATION

BACKGROUND

Modern computing devices have become ubiquitous tools for personal, business, and social uses. Furthermore, the number of such modern computing devices having access to the Internet from within homes, offices, etc., has increased significantly over the last several years. For example, between smartphones, tablets, laptops, desktop computers, smart appliances, security cameras, digital home assistant devices, etc., households can contain a multitude of Internet connected computing devices. Typically, by default, these connected devices equally share the bandwidth available to the home or office, which can result in a poor experience on various devices during use. For example, bandwidth allocated to one or more computing devices which are connected but are not presently in use will inherently limit the bandwidth available to the other devices which are presently in use (e.g., streaming digital content).

Network traffic routing devices, such as routers, gateways, access points, etc., often allow a certain level of control to prioritize the bandwidth for specific devices, such as may be identified by a media access control (MAC) address or an Internet Protocol (IP) address, groups of devices, port numbers chosen by users, or well-known ports used by applications. Such prioritization usually requires user intervention to setup and configure. However, oftentimes the average home user may not be aware of the availability of such configuration options, or may find it tedious to configure and simply avoid doing so as a result. Furthermore, as conditions in each household are likely to be different and are apt to change regularly, configuration settings may not be appropriate from one day to the next or even from one hour to the next.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
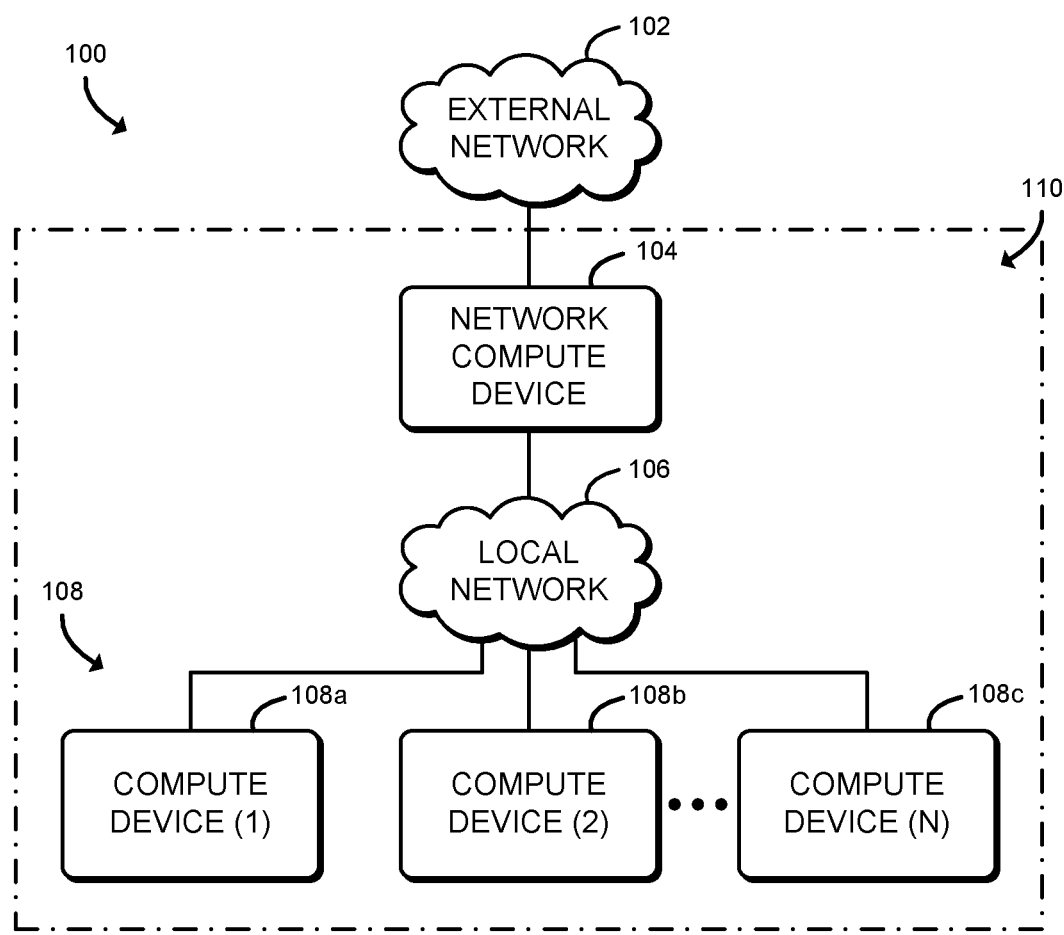
FIG. 1 is a simplified block diagram of at least one embodiment of a system for context-aware dynamic bandwidth allocation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for context-aware dynamic bandwidth allocation includes a network compute device 104 communicatively coupled to multiple compute devices 108 via a local network 106. The network compute device 104 is additionally communicatively coupled to an external network 102, such as may be used to access the Internet. As illustratively shown, the each of the network compute device 104 and the compute devices 108 are located in a structure 110, which may be any type of building, such as a house, a room in a house, an office, a floor of a building, a section of a building, etc., for which the compute devices 108 reside on the same network. Accordingly, it should be appreciated that, in alternative embodiments, there may be more than one network compute device 104 and/or more than one local network 106.

The network compute device 104 is configured to receive network traffic (e.g., network packets, Ethernet frames, etc.) originating from the external network 102 for transmission to one or more of the compute devices 108, as well as receive network traffic originating from the compute devices 108 (i.e., via the local network 106) for transmission to the external network 102. It should be appreciated that, while not illustratively shown, the network compute device 104 may be additionally configured to route traffic to other network compute devices (e.g., one or more access points, extenders, etc.), which may be directly coupled to the network compute device 104 or indirectly coupled via another network compute device. As shown in the illustrative system 100, the compute devices 108 include a first compute device 108 designated as compute device (1) 108a, a second compute device 108 designated as compute device (2) 108b, and a third compute device 108 designated as compute device (N) 108c (e.g., in which the compute device (N) 108c represents the "Nth" compute device 108 and "N" is a positive integer).

In use, as will be described in further detail below, the network compute device 104 is additionally configured to dynamically allocate bandwidth to each of the connected compute devices 108. To do so, the network compute device 104 is configured to determine a context for each of the compute devices 108. The context may be based on any information usable to identify a present state of use and/or level of importance of the respective compute device 108 and/or the data associated therewith. The network compute device 104 may be configured to obtain such information through information received from sensors coupled to the compute devices 108 (e.g., always-on, always watching/listening devices), data provided by applications presently executing on the compute devices 108, a result of analysis of network traffic to identify workload/flow types, etc. The network compute device 104 is additionally configured to identify patterns based on usage. Such usage patterns may be identified based on historically allocated bandwidth and may be device, user, and/or location specific, for example.

To effectively allocate the bandwidth to each of the connected compute devices 108, the network compute device 104 is further configured to associate a priority level with each determined context, such that the bandwidth for each compute device 108 can be allocated based on the priority associated with that the context for each compute device 108. For example, the network compute device 104 may be configured to allocate a higher amount of bandwidth to one compute device 108 having a context with a higher priority level relative to another compute device 108 having a context with a lower priority level, and consequently a lower amount of bandwidth, or no bandwidth under certain conditions, allocated thereto.

Figure 2:
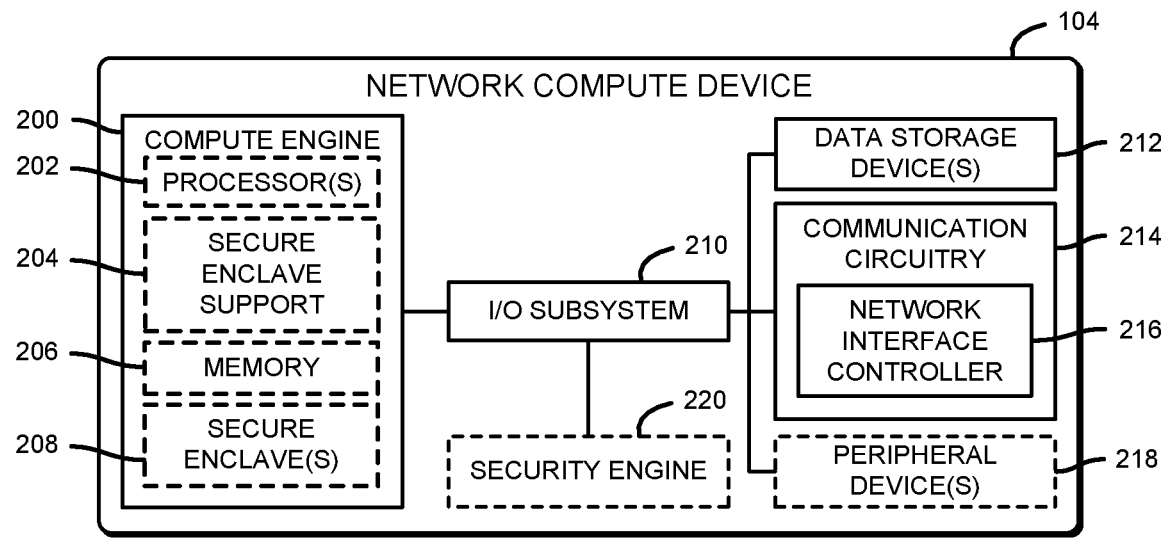
FIG. 2 is a simplified block diagram of at least one embodiment of the network compute device of the system of FIG. 1.

The network compute device 104 may be embodied as any type of computation or computer device capable of performing the functions described herein, including, without limitation, a router, a gateway, an access point, a range extender, an enhanced network interface controller (NIC), or any other combination of compute/storage device(s) capable of performing the functions described herein. Referring now to FIG. 2, an illustrative network compute device 104 is shown that includes a compute engine 200, an I/O subsystem 210, one or more data storage devices 212, communication circuitry 214, and, in some embodiments, one or more peripheral devices 218 and/or a security engine 220. It should be appreciated that the network compute device 104 may include other or additional components, such as those commonly found in a typical computing device (e.g., various input/output devices, cooling and power devices, and/or other components), in other embodiments. Additionally, in some embodiments, one or more of the illustrative components may be incorporated in, or otherwise form a portion of, another component.

The compute engine 200 may be embodied as any type of device or collection of devices capable of performing the various compute functions as described herein. In some embodiments, the compute engine 200 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 200 may include, or may be embodied as, one or more processors 202 (i.e., one or more central processing units (CPUs)), a secure enclave support 204, memory 206, and one or more secure enclaves 208.

The processor(s) 202 may be embodied as any type of processor capable of performing the functions described herein. For example, the processor(s) 202 may be embodied as one or more single-core processors, one or more multi-core processors, a digital signal processor, a microcontroller, or other processor or processing/controlling circuit(s). In some embodiments, the processor(s) 202 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The secure enclave support 204 allows the processor(s) 202 to establish a trusted execution environment (TEE) known as a secure enclave (see, e.g., the secure enclave(s) 208), in which executing code may be measured, verified, and/or otherwise determined to be authentic. Additionally, code and data included in the secure enclave(s) 208 may be encrypted or otherwise protected from being accessed by code executing outside of the secure enclave. For example, code and data included in the secure enclave may be protected by hardware protection mechanisms of the processor(s) 202 while being executed or while being stored in certain protected cache memory (not shown) of the processor(s) 202.

The code and data included in the secure enclave(s) 208 may be encrypted when stored in a shared cache or the memory 206. The secure enclave support 204 may be embodied as a set of processor instruction extensions that allows the processor(s) 202 to establish one or more secure enclaves 208 in the memory 206. For example, the secure enclave support 204 may be embodied as Intel® Software Guard Extensions (SGX) technology. In some embodiments, the memory 206 may be used to store the contents of one or more secure enclaves. When stored by the memory 206, the contents of the secure enclave may be encrypted to prevent unauthorized access.

The memory 206 may be embodied as any type of volatile (e.g., dynamic random access memory (DRAM), etc.) or non-volatile memory or data storage capable of performing the functions described herein. It should be appreciated that the memory 206 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 200 is communicatively coupled to other components of the network compute device 104 via the I/O subsystem 210, which may be embodied as circuitry and/or components to facilitate input/output operations with the processor 202, the memory 206, and other components of the network compute device 104. For example, the I/O subsystem 210 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 210 may form a portion of a system-on-a-chip (SoC) and be incorporated, along with one or more of the processor 202, the memory 206, and other components of the network compute device 104, on a single integrated circuit chip.

The one or more data storage devices 212 may be embodied as any type of storage device(s) configured for short-term or long-term storage of data, such as, for example, memory devices and circuits, memory cards, hard disk drives, solid-state drives, or other data storage devices. Each data storage device 212 may include a system partition that stores data and firmware code for the data storage device 212. Each data storage device 212 may also include an operating system partition that stores data files and executables for an operating system.

The communication circuitry 214 may be embodied as any communication circuit, device, or collection thereof, capable of enabling communications between the network compute device 104 and the compute devices 108, as well as any network communication enabling devices, such as an access point, router, etc., to allow communication to/from the network compute device 104. Accordingly, the communication circuitry 214 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. It should be appreciated that, in some embodiments, the communication circuitry 214 may include specialized circuitry, hardware, or combination thereof to perform pipeline logic (e.g., hardware-based algorithms) for performing the functions described herein, including processing network packets, making routing decisions, performing computational functions, etc.

In some embodiments, performance of one or more of the functions of communication circuitry 214 as described herein may be performed by specialized circuitry, hardware, or combination thereof of the communication circuitry 214, which may be embodied as a system-on-a-chip (SoC) or otherwise form a portion of a SoC of the network compute device 104 (e.g., incorporated on a single integrated circuit chip along with a processor 202, the memory 206, and/or other components of the network compute device 104). Alternatively, in some embodiments, the specialized circuitry, hardware, or combination thereof may be embodied as one or more discrete processing units of the network compute device 104, each of which may be capable of performing one or more of the functions described herein.

The illustrative communication circuitry 214 includes a network interface controller (NIC) 216. The NIC 216 may be embodied as one or more add-in-boards, daughtercards, network interface cards, controller chips, chipsets, or other devices that may be used by the network compute device 104. In some embodiments, the NIC 216 may be embodied as part of a system-on-a-chip (SoC) that includes one or more processors, or included on a multichip package that also contains one or more processors. In some embodiments, the NIC 216 may include other components which are not shown, such as a local processor, an accelerator device (e.g., any type of specialized hardware on which operations can be performed faster and/or more efficiently than is possible on the local general-purpose processor), and/or a local memory local to the NIC 216. In such embodiments, the local processor and/or the accelerator device of the NIC 216 may be capable of performing one or more of the functions described herein.

The one or more peripheral devices 218 may include any type of device that is usable to input information into the network compute device 104 and/or receive information from the network compute device 104. The peripheral devices 218 may be embodied as any auxiliary device usable to input information into the network compute device 104, such as a keyboard, a mouse, a microphone, a barcode reader, an image scanner, etc., or output information from the network compute device 104, such as a display, a speaker, graphics circuitry, a printer, a projector, etc. It should be appreciated that, in some embodiments, one or more of the peripheral devices 218 may function as both an input device and an output device (e.g., a touchscreen display, a digitizer on top of a display screen, etc.). It should be further appreciated that the types of peripheral devices 218 connected to the network compute device 104 may depend on, for example, the type and/or intended use of the network compute device 104. Additionally or alternatively, in some embodiments, the peripheral devices 218 may include one or more ports, such as a USB port, for example, for connecting external peripheral devices to the network compute device 104.

The security engine 220, which may be embodied as any hardware component(s) or circuitry capable of providing security-related services to the network compute device 104. In particular, the security engine 220 may include a microprocessor, microcontroller, or other embedded controller capable of executing firmware and/or other code independently and securely from the processor(s) 202. Thus, the security engine 220 may be used to establish a trusted execution environment (TEE) separate from code executed by the processor(s) 202. The security engine 220 may communicate with the processor(s) 202 and/or other components of the network compute device 104 over a dedicated bus, such as a host embedded controller interface (HECI).

The security engine 220 may also provide remote configuration, control, or management of the network compute device 104. In an illustrative embodiment, the security engine 220 may be embodied as a converged security and manageability engine (CSME) incorporated in a SoC of the network compute device 104. In some embodiments, the security engine 220 may be embodied as a manageability engine, an out-of-band processor, a Trusted Platform Module (TPM), or other security engine device or collection of devices. Further, in some embodiments, the security engine 220 may also be capable of communicating using an interconnect/bus or a dedicated communication circuit independently of the state of the network compute device 104 (e.g., independently of the state of the processor(s) 202), also known as "out-of-band" communication.

Referring back to FIG. 1, the external network 102 may be embodied as any type of wired or wireless communication network, including but not limited to an edge network (e.g., a multi-access edge computing network), a fog network, a cellular network (e.g., Global System for Mobile Communications (GSM), Long-Term Evolution (LTE), 5G, etc.), a telephony network, a digital subscriber line (DSL)

network, a cable network, a wide area network (WAN), a global network (e.g., the Internet), or any combination thereof. It should be appreciated that, in some embodiments, the external network 102 may serve as a centralized network and may be communicatively coupled to another network (e.g., the Internet). Accordingly, the external network 102 may include a variety of other virtual and/or physical network computing devices (e.g., routers, switches, network hubs, servers, storage devices, compute devices, etc.), as needed to facilitate the transmission of network traffic through the external network 102.

The local network 106 may be embodied as any type of wired or wireless communication network, including but not limited to a local area network (LAN), a wireless local area network (WLAN), virtual local area network (VLAN), a personal area network (PAN), a wireless personal area network (WPAN), etc. Accordingly, similar to the external network 102, depending on the embodiment, the local network 106 may include a variety of other virtual and/or physical network computing devices (e.g., routers, switches, network hubs, access points, range extenders, etc.), as needed to facilitate the transmission of network traffic through the local network 106.

Figure 3:
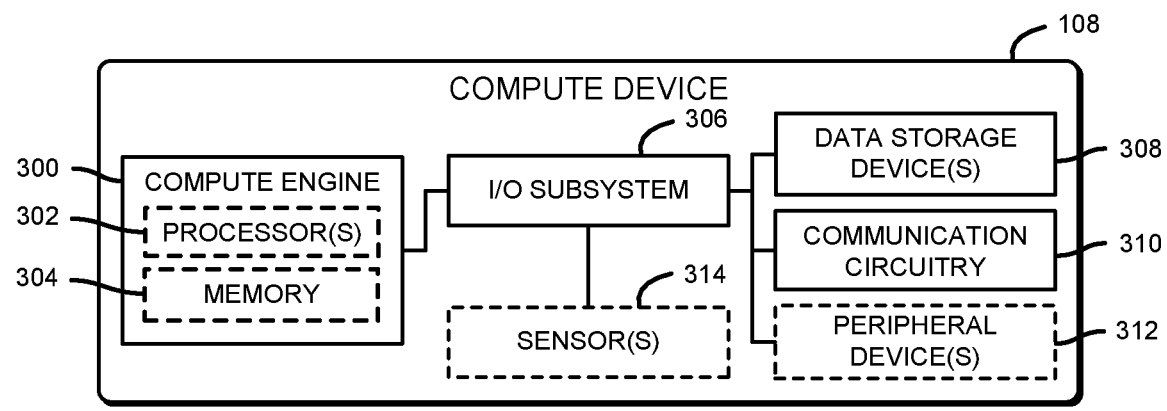
FIG. 3 is a simplified block diagram of at least one embodiment of one of the compute devices of the system of FIG. 1.

Each of the compute devices 108 may be embodied as any type of computation or computing device capable of performing the functions described herein, including, without limitation, a mobile computing device (e.g., a smartphone, a tablet computer, a laptop computer, a notebook computer, a wearable device), a smart device (e.g., a smart television, a smart appliance, etc.), a digital home assistant device, a security camera, an Internet-of-Things (IoT) device, or any other type of Internet-connection capable computing device. Referring now to FIG. 3, as illustratively shown, the compute device 108 includes similar and/or like components to those of the illustrative network compute device 104 of FIG. 2, including a compute engine 300 with one or more processors 302 and memory 304, an I/O subsystem 306, one or more data storage devices 308, communication circuitry 310, and, in some embodiments, one or more peripheral devices 312. As such, figures and descriptions of the similar/like components are not repeated herein for clarity of the description with the understanding that the description of the corresponding components provided above in regard to the network compute device 104 of FIG. 2 applies equally to the corresponding components of the compute device 108 of FIG. 3. Of course, it should be appreciated that the respective computing devices may include additional and/or alternative components, depending on the embodiment.

The illustrative compute device 108 additionally includes, in some embodiments, one or more sensors 314. Depending on the embodiment of the compute device 108, the sensor(s) 314 may include may include one or more sensors and/or actuators. For example, the sensor(s) may be include, but are not limited to, a motion sensor, an image sensor, a position sensor, a temperature sensor, a humidity sensor, a power sensor, an environmental sensor, a radar sensor, a vision sensor, or any other type of sensor.

Figure 4:
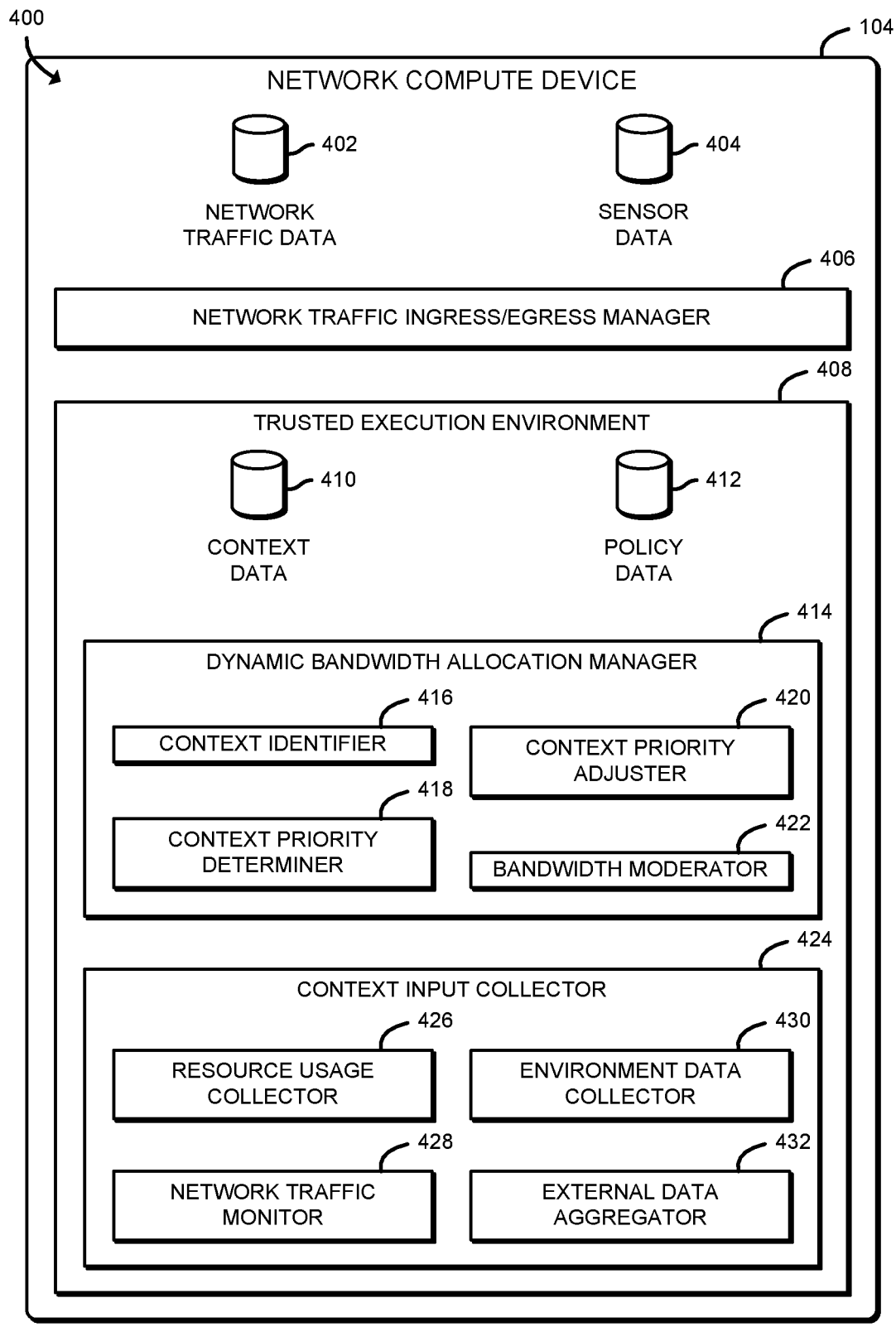
FIG. 4 is a simplified block diagram of at least one embodiment of an environment of the network compute device of FIG. 1 for context-aware dynamic bandwidth allocation.

Referring now to FIG. 4, in use, the network compute device 104 establishes an illustrative environment 400 during operation. The illustrative environment 400 includes a network traffic ingress/egress manager 406, a dynamic bandwidth allocation manager 414, and a context input collector 424. The various components of the environment 400 may be embodied as hardware, firmware, software, or a combination thereof. As such, in some embodiments, one or more of the components of the environment 400 may be embodied as circuitry or collection of electrical devices (e.g., network traffic ingress/egress management circuitry 406, dynamic bandwidth allocation management circuitry 414, context input collection circuitry 424, etc.).

It should be appreciated that, in such embodiments, one or more of the network traffic ingress/egress management circuitry 406, the dynamic bandwidth allocation management circuitry 414, and the context input collection circuitry 424 may form a portion of one or more of the compute engine 200 (i.e., the processor(s) 202 and/or the memory 206), the I/O subsystem 210, the data storage device(s) 212, the communication circuitry 214, an application specific integrated circuit (ASIC), a programmable circuit such as a field-programmable gate array (FPGA), and/or other components of the network compute device 104.

For example, any of the circuitry (e.g., the network traffic ingress/egress management circuitry 406, the dynamic bandwidth allocation management circuitry 414, the context input collection circuitry 424, etc.) may be embodied as at least a portion of the compute engine 200 and associated instructions stored in the memory 206 and/or the data storage device(s) 212, which may be executed by the processor(s) 202. Accordingly, it should be appreciated that, each of the functions described herein as being performed by the network traffic ingress/egress management circuitry 406, the dynamic bandwidth allocation management circuitry 414, and/or the context input collection circuitry 424 may be performed, at least in part, by one or more components of the network compute device 104, such as the compute engine 200, the I/O subsystem 210, the communication circuitry 214, and/or other components of the network compute device 104.

Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the compute engine 200 or other components of the network compute device 104. It should be appreciated that the network compute device 104 may include other components, sub-components, modules, sub-modules, logic, sub-logic, and/or devices commonly found in a computing device, which are not illustrated in FIG. 4 for clarity of the description.

In the illustrative environment 400, the network compute device 104 additionally includes network traffic data 402, sensor data 404, context data 410, and policy data 412, each of which may be accessed by the various components and/or sub-components of the network compute device 104. Additionally, it should be appreciated that in some embodiments the data stored in, or otherwise represented by, each of the network traffic data 402, the sensor data 404, the context data 410, and the policy data 412 may not be mutually exclusive relative to each other. For example, in some implementations, data stored in the network traffic data 402 may also be stored as a portion of one or more of the sensor data 404, the context data 410, and/or the policy data 412. As such, although the various data utilized by the network compute device 104 is described herein as particular discrete data, such data may be combined, aggregated, and/or otherwise form portions of a single or multiple data sets, including duplicative copies, in other embodiments.

The illustrative environment 400 additionally includes a trusted execution environment (TEE) 408. As illustratively shown, each of the dynamic bandwidth allocation manager 414 and the context input collector 424 are executed in the TEE 408. In some embodiments, the TEE 408 may be an SGX secure enclave including user-level (e.g., ring-3) code protected with the secure enclave support 204 of the processor(s) 202. In other embodiments, the TEE 408 may be embodied as any trusted application or other trusted component of the network compute device 104.

The network traffic ingress/egress manager 406, which may be embodied as hardware, firmware, software, virtualized hardware, emulated architecture, and/or a combination thereof as discussed above, is configured to receive inbound and route/transmit outbound network traffic. To do so, the network traffic ingress/egress manager 406 is configured to facilitate inbound network communications (e.g., network traffic, network packets, network flows, etc.) to the network compute device 104. Accordingly, the network traffic ingress/egress manager 406 is configured to manage (e.g., create, modify, delete, etc.) connections to physical and virtual network ports (i.e., virtual network interfaces) of the network compute device 104 (e.g., via the communication circuitry 214), as well as the ingress buffers/queues associated therewith. Additionally, the network traffic ingress/egress manager 406 is configured to facilitate outbound network communications (e.g., network traffic, network packet streams, network flows, etc.) from the network compute device 104. To do so, the network traffic ingress/egress manager 406 is configured to manage (e.g., create, modify, delete, etc.) connections to physical and virtual network ports/interfaces of the network compute device 104 (e.g., via the communication circuitry 214), as well as the egress buffers/queues associated therewith.

To facilitate the inbound/outbound network traffic to/from the connected compute devices 108, the network traffic ingress/egress manager 406 is configured to store information related to each of the connected compute devices 108 (i.e., compute device information), such as a MAC address, an IP address, port information, etc. Additionally, the network traffic ingress/egress manager 406 is configured to store information related to the network traffic, such as source and destination identifiers (e.g., address/port numbers), flow identification, workload identification, etc. In some embodiments, such network traffic and/or compute device 108 related information (e.g., ports, Internet Protocol (IP) addresses, etc.) may be stored in the network traffic data 402.

The network traffic ingress/egress manager 406 is further configured to manage configuration settings for each connected compute device 108. For example, the network traffic ingress/egress manager 406 is configured to determine whether network traffic is permitted to enter/exit the local network 106. To make such a determination, the network traffic ingress/egress manager 406 may rely on a network policy that includes a whitelist provisioning policy, for example. Additionally, the network traffic ingress/egress manager 406 is configured to enforce the network policy and other policies, such as the moderated bandwidth allocation policy described herein. In some embodiments, the policy related rules may be stored in the policy data 412.

The dynamic bandwidth allocation manager 414, which may be embodied as hardware, firmware, software, virtualized hardware, emulated architecture, and/or a combination thereof as discussed above, is configured to manage the configuration for the dynamic allocation of bandwidth across connected compute devices 108 at a given time. To do so, the illustrative dynamic bandwidth allocation manager 414 includes a context identifier 416, a context priority determiner 418, a context priority adjuster 420, and a bandwidth moderator 422.

The context identifier 416 is configured to identify a context for each of the compute devices 108. To do so, the context identifier 416 is configured to analyze a set of inputs (e.g., context inputs collected by the context input collector 424) and identify the context based thereon. The set of context inputs, as described in further detail below, may be comprised of any type of data that is usable to determine the context for a compute device 108, such as activity states of the compute device 108, environment data collected by the compute device, externally sourced data, etc. Additionally, the set of context inputs may include information associated with the network traffic being transmitted to/from the compute device 108.

The context identifier 416 is configured to analyze the context inputs using various techniques, such as object detection, people detection, motion detection, etc., to identify the context. It should be appreciated that the context identifier 416 is configured to draw inferences on results of the analysis of the different context inputs to determine the context. Such inferences may include the detection of usage patterns over time of different devices within a home, for example. Data associated with the identified contexts (e.g., context information, map between identifier of a compute device 108 and the identified context, etc.) may be stored in the context data.

The context priority determiner 418 is configured to determine a priority for each context identified for each compute device 108, which may be based on an individual priority associated with each activity, device, etc., that can be influenced by one or more applicable weights relative to the context. In some embodiments, the determined context priorities may be stored in the context data 410. Depending on the embodiment, the context priority determiner 418 may be configured to rely on a previously configured priority configuration or training through machine learning models. For example, one family member may be is watching a movie being streamed to a television in the living room, while another family member is browsing the web on their smartphone in master bedroom. In such an example, the context priority determiner 418 may be configured to give a higher priority to digital media being streamed over web browsing and/or to the television in the living room relative to that smartphone based on the previously configured priority configuration settings.

In a more granular example, two smartphones in the home may be browsing the web, but one smartphone belongs to a parent and the other smartphone belongs to a child of the parent. In such an example, the web browsing activity may have the same priority, but the parent's smartphone may be assigned a higher priority than the child's smartphone. Accordingly, the context priority determiner 418 would assign a higher priority to the parent's smartphone, as device ownership serves as a tie-breaker and/or is given a higher weight relative to the activity being performed on the devices. Similarly, in another example in which two televisions are streaming digital content (e.g., movies), the deciding priority factor between the two televisions may be the location in which the television resides (e.g., the basement versus a bedroom), the time of day during, a detected presence of a viewer, etc.

The context priority adjuster 420 is configured to make any applicable adjustments to the determined context priority. For example, in some embodiments, one or more policies may be in place which can influence the context priority. In an illustrative example, a policy may indicate a capped bandwidth, provide a whitelist of approved compute devices 108, etc. Accordingly, in such embodiments, the context priority adjuster 420 is configured to update the determined priorities based on the applicable one or more policies.

The bandwidth moderator 422 is configured to determine how to divide the total available bandwidth across the connected compute devices 108 based on the context priority associated with each compute device 108. In other words, the bandwidth moderator 422 is configured to set a portion of bandwidth from the total available bandwidth to be allocated to each applicable compute device 108 in accordance with the respective context and any other requirements. Upon making the bandwidth allocation determination, the bandwidth moderator 422 is configured to update a network policy (e.g., a moderated bandwidth allocation policy) that stipulates how much of the total bandwidth is to be allocated to each compute device 108.

To determine the bandwidth allocation, the bandwidth moderator 422 is configured to define a prioritization schedule based on the following scheduling function:

$$S=F(TRUST(C,R,W),A,UP,M)$$

Wherein "TRUST( )" is a function that computes a trust score or probability using the platform TEE 408; "C" is a contextual probability that dynamic bandwidth allocation manager 414 is configured to preserve priority associated with an application at risk; "R" represents a level of risk that is at stake (e.g., the value or opportunity cost resulting from performing the scheduling with a specific priority); "W" represents the set of applications in "A" that complies with a whitelist configuration known to be trustworthy via the TEE 408, "UP" is the sum of various user parametrized constraints, such as scheduling, performance requirements, security requirements, contextual relevance, and/or any other configurable attributes; and "M" represents the machine learning feedback to be incorporated for a next iteration of prioritization/scheduling calculations. Accordingly, the bandwidth moderator 422 is configured to use the output "S" to moderate the bandwidth scheduling across the applications set "A."

In general, it can be assumed that a distributed home network with application classification data (d1 ... dn) has a priority level L=(l1, ..., ln) such that l1 denotes data at priority level l1 and l2 as a second priority level, and data classifications l3 and l4 are respectively at lower classification levels than l2. It can be further assumed that a distribution of applications a in A={a1, a2, ... an} classifies data in (d1 ... dn) with priority levels L, such that a(DL)={(d1, l1), (d2,l2), ..., (dn,ln)} and where a1=>(D1L1) is a first datum having a first priority level and a second priority level exists for a second datum at application a2 such that a2=>(d2/2).

In an illustrative embodiment of the scheduling function "F" in which the structure 110 is an office (i.e., an enterprise scenario) in which there is a corporate webcast to be scheduled across multiple sites, it should be appreciated that client content consumption compute devices 108 can be heterogeneous. Such compute devices 108 may include corporate provisioned devices (e.g., smartphones, laptops, tablets, etc.), corporate mass audience devices (e.g., in corporate auditoriums, conference rooms, etc.), user owned devices (e.g. IoT devices, user phones, etc.), etc., having varying security/user experience attributes. Under such conditions, "A" may represents the 'Webcast' application under consideration.

In furtherance of the illustrative embodiment in which the corporate information technology group were to prioritize only corporate provisioned devices and corporate mass audience devices for the session, then "W" would include those as whitelist configuration (e.g. they may all belong to the same EPID pool preserving anonymity enforced via platform TEE) and "R" would represent low risk score as they are all part of the corporate EPID and each other can attest their provisioned corporate credentials. However, "C" would be high, given the event may be a 'required' or 'mandated' event for all employees and attendance would be anticipated to be high. Additionally, "UP" may include one or more administrative policy preferences (e.g., areas/devices/LANs restricted to receiving the call) and may incorporate user preference in terms of how content may be delivered (e.g., format, display, etc.). Further, "M" would represent any machine learnt behavior from the past observations/context determinations (e.g. content delivery was smoother using the Google Chrome® browser relative to an edge based browser, due to software incompatibility in terms of network protocol handling).

The bandwidth moderator 422 may be additionally configured to translate the context and priority information for each context into a language/protocol that the network compute device 104 can understand and set the bandwidth priorities accordingly. Depending on the embodiment, the network compute device 104 may provide one or more interfaces through which the bandwidth priority can be set dynamically. It should be appreciated that, in some embodiments, at least a portion of the functions described herein as being performed by the dynamic bandwidth allocation manager 414 may require the bandwidth moderator 422 to login to the network compute device 104 to update the bandwidth configuration settings. Accordingly, it should be appreciated that, in such embodiments, the bandwidth moderator 422 and/or any other functions of the dynamic bandwidth allocation manager 414 may be configured to login to the network compute device 104.

In some embodiments, the dynamic bandwidth allocation manager 414, or more particularly the bandwidth moderator 422, may implement a protocol that can understand context inputs directly, in which case the dynamic bandwidth allocation manager 414 can receive the context and priority info (e.g., from the context identifier 416 and the context priority determiner 418) through the applicable interface and allow the network compute device 104 to configure the bandwidth priorities. Additionally or alternatively, in some embodiments the dynamic bandwidth allocation manager 414 may provide a standard interface, such as a web interface, usable to login and set priorities (e.g., based on port numbers, compute device identifiers, etc.). In such embodiments, the dynamic bandwidth allocation manager 414 is configured to translate the context input to a language understood by the network compute device 104. In an illustrative example, a context input such as "living room television is being utilized, bedroom computer is not" would be mapped to device identifiers, ports, and protocols of the respective compute devices 108 (i.e., the living room television and the bedroom computer).

In some embodiments, the dynamic bandwidth allocation manager 414 may additionally or alternatively include an additional level of intelligence, which instead of translating the context information to network layer information so it can be consumed by the network compute device 104, the network compute device 104 itself includes a higher level stack that in-itself is context aware. In such embodiments, the session layer protocol may describe rules for a "surveillance camera session" or a "streaming entertainment session." As such, the context information can be directly fed into this stack layer of the network compute device 104 such that the router can directly deal with the quality of service without having to manage packet level priority. It should be appreciated that, irrespective of the interface used, a key requirement on the network compute device 104 is that the changes should take effect dynamically.

The context input collector 424, which may be embodied as hardware, firmware, software, virtualized hardware, emulated architecture, and/or a combination thereof as discussed above, is configured to collect input data usable to determine a present context of each connected compute device 108. To do so, the illustrative context input collector 424 includes a resource usage collector 426, a network traffic monitor 428, an environment data collector 430, and an external data aggregator 432.

The resource usage collector 426 is configured to collect resource usage data from the compute devices 108. Such resource usage data may include any information usable to identify a present usage (e.g., a usage metric, a percentage used/available of a total amount, etc.) of each compute device 108. For example, the resource usage data may include any information relating to a presently executing application (e.g., a type of the application, a workload associated with the application, one or more quality of service requirements associated with the application, etc.) and/or component (e.g., power, compute, memory, network capacity, etc.) of the compute device 108.

The network traffic monitor 428 is configured to monitor at least a portion (e.g., a flow, a sample, etc.) of network traffic associated with each compute device 108 to identify a characteristic thereof, such as a workload type (e.g., audio, video, data, etc.), associated services/applications, etc. To do so, the network traffic monitor 428 may be configured to identify signature headers to identify the services in use, inspect at least a portion of a payload in a stream of network traffic.

The environment data collector 430 is configured to collect data from other sensors on the network that may include data usable to determine the context of a compute device 108 or another sensing device on the same local network 106. Such environment data may include collected information associated with one or more sensors of each compute device 108. Such sensor input may be usable to identify a proximity of users to the compute devices 108, applications being executed on the compute devices 108, a location of the compute devices relative to the network compute device 104 and/or the structure 110 in which the local network 106 resides, etc. Accordingly, the sensor input may include, but is not limited to, audio (e.g., from a microphone), images (e.g., from a camera/image sensor), and/or any other type of sensor read data usable that can be analyzed to determine the context. In some embodiments, the collected sensor data may be stored in the sensor data 404.

The external data aggregator 432 is configured to collect external data from other resources that are not on the local network, which can be analyzed to further determine the context. Such external data may be collected from external resources (e.g., the Internet, remote data storage devices, etc.) that are accessed via the external network 102. Examples of such external data can include weather information from a weather aggregating resource, quality of service requirements from a remote service provider, information from a federated database system, etc. In some embodiments, the context input data collected may be stored in the context data 410.

Figure 5A:
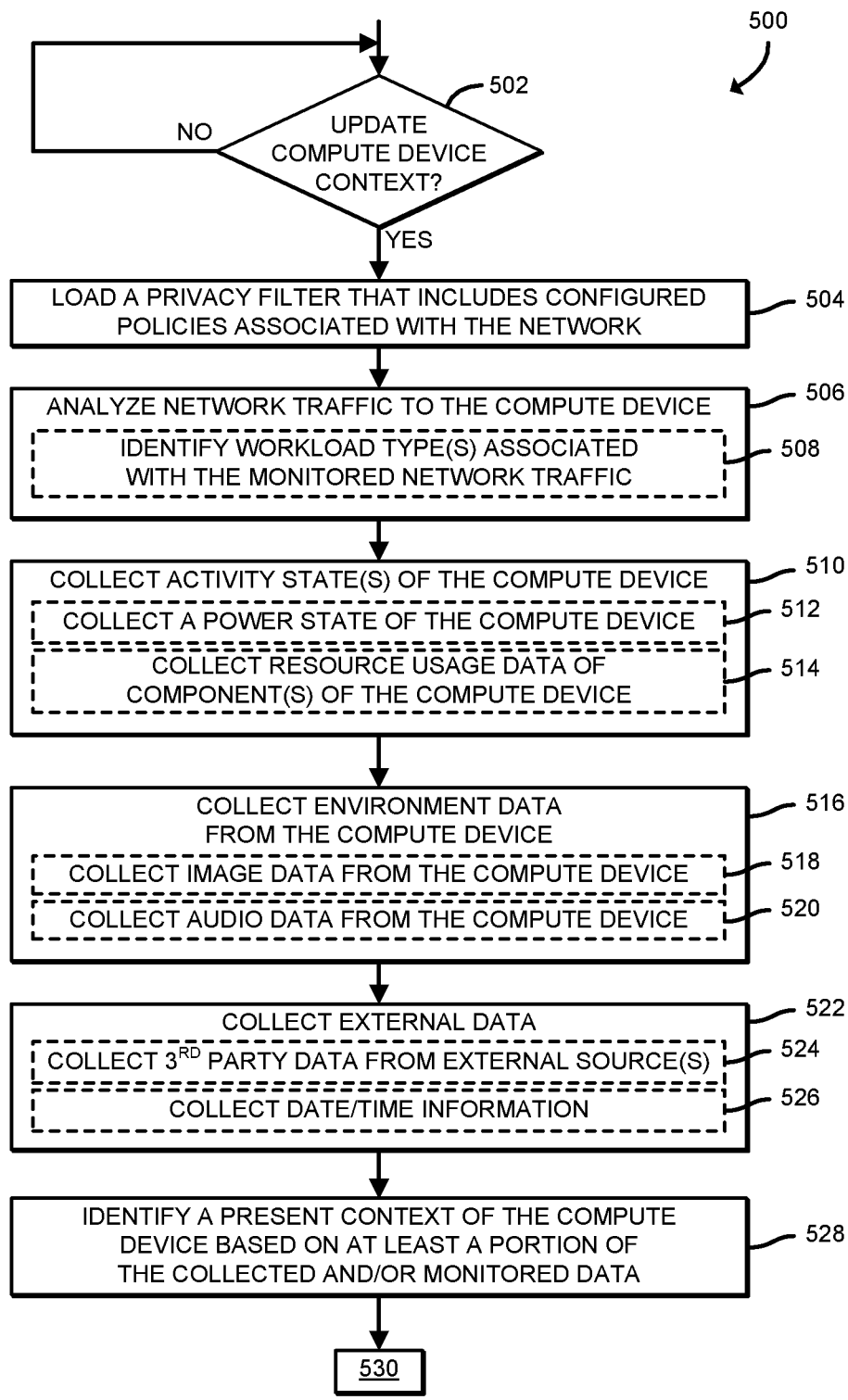
FIGS. 5A and 5B are a simplified flow diagram of at least one embodiment of a method for context-aware dynamic bandwidth allocation that may be executed by the network compute device of FIGS. 1, 2, and 4.
Figure 5B:
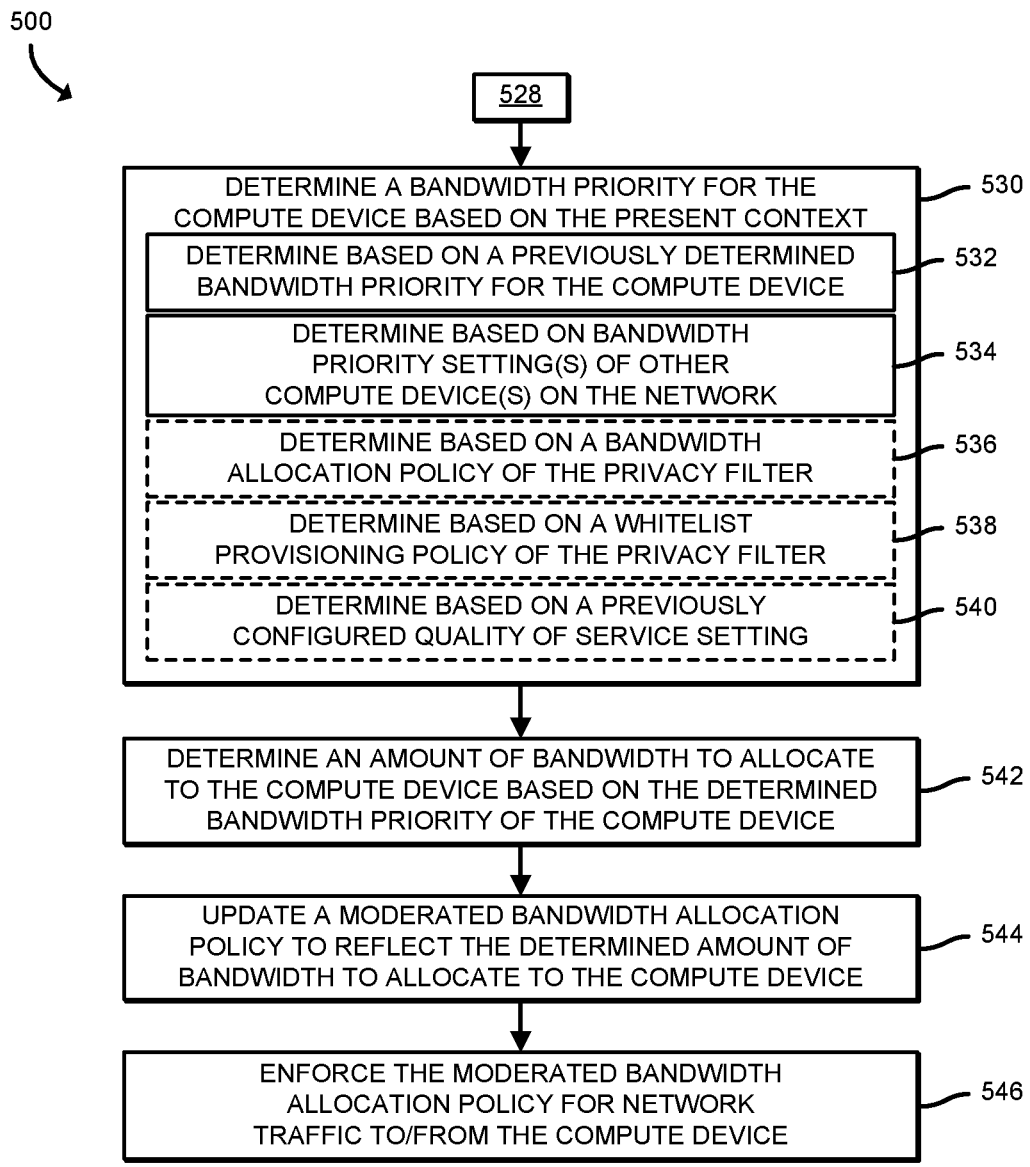

Referring now to FIGS. 5A and 5B, a method 500 for context-aware dynamic bandwidth allocation is shown which may be executed by a compute device (e.g., the network compute device 104 of FIGS. 1, 2, and 4). The method 500 begins with block 502, in which the network compute device 104 determines whether to update a context of a compute device 108. For example, the method 500 may be triggered by an initial setup or a detected context adjustment trigger. The detected context adjustment trigger may include any type of status change that a result of which should result in the context for one or more of the compute devices 108 being changed, such as a connectivity change, a configuration change, a required quality of service change, a compute device 108 resource change, a workload change, etc. If so, the method 500 advances to block 504, in which the network compute device 104 loads a privacy filter (e.g., from a TEE) that includes configured policies (e.g., previously configured policies or default configuration policies) associated with the network compute device 104.

In block 506, the network compute device 104 analyzes network traffic to the compute device. To do so, the network compute device 104 may be configured to periodically sample the network traffic for analysis. For example, in block 508, the network compute device 104 may analyze the network traffic to identify one or more workload types associated with the monitored network traffic, which may be usable to identify a type of data associated with the network traffic, applications/services being used, etc. In block 510, the network compute device 104 collects one or more activity states from the compute device 108. For example, in block 512, the network compute device 104 may collect a power state of the compute device 108 (e.g., standby, low-power, powered on, a preconfigured performance mode state, etc.). Additionally or alternatively, in block 514, the network compute device 104 may collect resource usage data from one or more physical and/or virtual components of the compute device 108. As described previously, such resource usage data may include any information usable to identify a present usage of a component, such as a usage metric, a percentage used/available of a total amount, etc.

In block 516, the network compute device 104 collects environment data from the compute device. As described previously, the environment data may include any type of data collected from one or more sensors of the compute device 108, such as information that is usable to identify a proximity of users to the compute devices 108, applications being executed on the compute devices 108, a location of the compute devices relative to the network compute device 104 and/or the structure 110 in which the local network 106 controlled by the network compute device 104, etc. For example, in block 518, the network compute device 104 may collect image data and/or, in block 520, collect audio data from the compute device 108. It should be appreciated that such image and/or audio data may be analyzed, for example, to identify an amount of light in the environment in which the compute device 108 resides, identify whether a user is present in the proximity of the compute device 108 or not, identify which user or users are presently using or is otherwise engaged with the compute device 108, etc.

In block 522, the network compute device 104 collects external data. As described previously, the external data may include any type of data that is usable to further determine or otherwise refine the context of the compute device 108, of as weather information, quality of service requirements, information from a federated database system, etc. Accordingly, for example, in block 524 the network compute device 104 may be configured to collect third ($3^{rd}$) party data from one or more external data sources. Additionally or alternatively, in block 526, the network compute device 104 collects data/time information, such as may be collected from a digital calendar application or digital home assistant.

In block 528, the network compute device 104 analyzes the collected and monitored data to identify a present context of the compute device 108 based on at least a portion of the collected and analyzed data. In block 530, the network compute device 104 determines a bandwidth priority for the compute device 108 based on the identified present context. To do so, in block 532, the network compute device 104 determines the bandwidth priority based on a previously determined bandwidth priority for the compute device 108. Additionally, in block 534, the network compute device 104 determines the bandwidth priority based on one or more bandwidth priority settings of one or more other compute devices 108 on the local network 106.

For example, in a situation where no one is at home, a motion alert from compute device 108 embodied as a video surveillance camera may be designated to carry a higher bandwidth priority over another compute device 108 embodied as a laptop that is downloading a file or backing up files to a cloud server. In another example in which a family may be watching a movie on a compute device 108 embodied as a television in the living room while another compute device 108 is embodied as another television streaming video in the bedroom is not being watched (e.g., because the family member left the room), the living room television would be assigned a higher bandwidth priority over the television in the bedroom. It should be appreciated that priority across ambient devices is configurable and securely managed via the platform TEE (e.g., the TEE 408 of FIG. 4)

In some embodiments, in block 536, the network compute device 104 may determine the bandwidth priority based on a bandwidth allocation policy of the privacy filter. Additionally or alternatively, in some embodiments, in block 538, the network compute device 104 determines the bandwidth priority based on a whitelist provisioning policy of the privacy filter. In some embodiments, in block 540, the network compute device 104 may additionally or alternatively determine the bandwidth priority based on a previously configured or otherwise required quality of service setting.

In block 542, the network compute device 104 determines an amount of bandwidth to allocate to the compute device based on the determined bandwidth priority of the compute device 108. In block 544, the network compute device 104 updates a moderated bandwidth allocation policy to reflect the determined amount of bandwidth to allocate to the compute device 108. In block 546, the network compute device 104 enforces the moderated bandwidth allocation policy for network traffic to/from the compute device 108.

EXAMPLES

Illustrative examples of the technologies disclosed herein are provided below. An embodiment of the technologies may include any one or more, and any combination of, the examples described below.

Example 1 includes a network compute device for context-aware dynamic bandwidth allocation, the network compute device comprising context input collection circuitry configured to collect context inputs from a plurality of compute devices communicatively coupled to the network compute device, wherein the context inputs are usable to identify a corresponding context of each compute device; and dynamic bandwidth allocation management circuitry configured to identify a context of a compute device of the plurality of compute devices based on the collected context inputs; determine a bandwidth priority for the compute device based on the identified context; determine an amount of bandwidth from a total available bandwidth to allocate to the compute device based on the determined bandwidth priority; and update a moderated bandwidth allocation policy to reflect the determined amount of bandwidth allocated to the compute device.

Example 2 includes the subject matter of Example 1, and wherein to collect context inputs includes to collect resource usage data of one or more components of the compute device.

Example 3 includes the subject matter of any of Examples 1 and 2, and wherein to collect context inputs includes to collect environment data from the compute device via one or more sensors of the compute device.

Example 4 includes the subject matter of any of Examples 1-3, and wherein to collect context inputs includes to collect one or more samples of network traffic transmitted to and received from the compute device, and wherein to identify the context of the compute device comprises to identify the context based on analysis of the collected samples.

Example 5 includes the subject matter of any of Examples 1-4, and wherein to determine the bandwidth priority comprises to determine the bandwidth priority relative to one or more previously determined bandwidth priorities of one or more other compute devices of the plurality of compute devices.

Example 6 includes the subject matter of any of Examples 1-5, and wherein to determine the bandwidth priority comprises to determine the bandwidth priority based on one or more quality of service requirements.

Example 7 includes the subject matter of any of Examples 1-6, and wherein the dynamic bandwidth allocation management circuitry is further configured to determine a trust score, and wherein to determine the bandwidth priority comprises to determine the bandwidth priority based at least in part on the determined trust score.

Example 8 includes the subject matter of any of Examples 1-7, and wherein to determine the trust score comprises to determine (i) a contextual probability that the network compute device is configured to preserve priority associated with an application at risk, (ii) a level of risk associated with scheduling the compute device using the determined bandwidth priority, and (iii) a set of applications in compliance with a whitelist configuration known to be trustworthy.

Example 9 includes the subject matter of any of Examples 1-8, and wherein to determine the trust score further comprises to determine the trust score as a function of one or more user parametrized constraints.

Example 10 includes the subject matter of any of Examples 1-9, and further including a trusted execution environment, wherein to determine the trust score comprises to determine the trust score using the trusted execution environment.

Example 11 includes the subject matter of any of Examples 1-10, and further including network traffic ingress/egress management circuitry configured to enforce the moderated bandwidth allocation policy to restrict network traffic bandwidth to the compute device based on the determined amount of bandwidth.

Example 12 includes one or more machine-readable storage media comprising a plurality of instructions stored thereon that, in response to being executed, cause a network compute device to collect context inputs from a plurality of compute devices communicatively coupled to the network compute device, wherein the context inputs are usable to identify a corresponding context of each compute device;

identify a context of a compute device of the plurality of compute devices based on the collected context inputs; determine a bandwidth priority for the compute device based on the identified context; determine an amount of bandwidth from a total available bandwidth to allocate to the compute device based on the determined bandwidth priority; and update a moderated bandwidth allocation policy to reflect the determined amount of bandwidth allocated to the compute device.

Example 13 includes the subject matter of Example 12, and wherein to collect context inputs includes to collect resource usage data of one or more components of the compute device.

Example 14 includes the subject matter of any of Examples 12 and 13, and wherein to collect context inputs includes to collect environment data from the compute device via one or more sensors of the compute device.

Example 15 includes the subject matter of any of Examples 12-14, and wherein to collect context inputs includes to collect one or more samples of network traffic transmitted to and received from the compute device, and wherein to identify the context of the compute device comprises to identify the context based on analysis of the collected samples.

Example 16 includes the subject matter of any of Examples 12-15, and wherein to determine the bandwidth priority comprises to determine the bandwidth priority relative to one or more previously determined bandwidth priorities of one or more other compute devices of the plurality of compute devices.

Example 17 includes the subject matter of any of Examples 12-16, and wherein to determine the bandwidth priority comprises to determine the bandwidth priority based on one or more quality of service requirements.

Example 18 includes the subject matter of any of Examples 12-17, and wherein the plurality of instructions further cause the network compute device to determine a trust score, and wherein to determine the bandwidth priority comprises to determine the bandwidth priority based at least in part on the determined trust score.

Example 19 includes the subject matter of any of Examples 12-18, and wherein to determine the trust score comprises to determine (i) a contextual probability that the network compute device is configured to preserve priority associated with an application at risk, (ii) a level of risk associated with scheduling the compute device using the determined bandwidth priority, and (iii) a set of applications in compliance with a whitelist configuration known to be trustworthy.

Example 20 includes the subject matter of any of Examples 12-19, and wherein to determine the trust score further comprises to determine the trust score as a function of one or more user parametrized constraints.

Example 21 includes the subject matter of any of Examples 12-20, and wherein to determine the trust score comprises to determine the trust score using a trusted execution environment of the network compute device.

Example 22 includes the subject matter of any of Examples 12-21, and wherein the plurality of instructions further cause the network compute device to enforce the moderated bandwidth allocation policy to restrict network traffic bandwidth to the compute device based on the determined amount of bandwidth.

Example 23 includes a network compute device for context-aware dynamic bandwidth allocation, the network compute device comprising circuitry for collecting context inputs from a plurality of compute devices communicatively coupled to the network compute device, wherein the context inputs are usable to identify a corresponding context of each compute device; means for identifying a context of a compute device of the plurality of compute devices based on the collected context inputs; means for determining a bandwidth priority for the compute device based on the identified context; means for determining an amount of bandwidth from a total available bandwidth to allocate to the compute device based on the determined bandwidth priority; and means for updating a moderated bandwidth allocation policy to reflect the determined amount of bandwidth allocated to the compute device.

Example 24 includes the subject matter of Example 23, and further including means for determining a trust score, and wherein the means for determining the bandwidth priority comprises means for determining the bandwidth priority based at least in part on the determined trust score.

Example 25 includes the subject matter of any of Examples 23 and 24, and wherein the means for determining the trust score comprises means for determining (i) a contextual probability that the network compute device is configured to preserve priority associated with an application at risk, (ii) a level of risk associated with scheduling the compute device using the determined bandwidth priority, and (iii) a set of applications in compliance with a whitelist configuration known to be trustworthy.

The invention claimed is:

1. A network compute device for context-aware dynamic bandwidth allocation, the network compute device comprising:
context input collection circuitry configured to collect context inputs from a plurality of compute devices communicatively coupled to the network compute device, wherein the context inputs are usable to identify a corresponding context of each compute device; and
dynamic bandwidth allocation management circuitry configured to:
identify a context of a compute device of the plurality of compute devices based on the collected context inputs, wherein the collected context inputs include environment data produced by one or more sensors of the compute device;
determine a bandwidth priority for the compute device based on the identified context;
determine an amount of bandwidth from a total available bandwidth to allocate to the compute device based on the determined bandwidth priority; and
update a moderated bandwidth allocation policy to reflect the determined amount of bandwidth allocated to the compute device.

2. The network compute device of claim 1, wherein to collect context inputs includes to collect resource usage data of one or more components of the compute device.

3. The network compute device of claim 1, wherein to collect context inputs includes to collect one or more samples of network traffic transmitted to and received from the compute device, and wherein to identify the context of the compute device comprises to identify the context based on analysis of the collected samples.

4. The network compute device of claim 1, wherein to determine the bandwidth priority comprises to determine the bandwidth priority relative to one or more previously determined bandwidth priorities of one or more other compute devices of the plurality of compute devices.

5. The network compute device of claim 1, wherein to determine the bandwidth priority comprises to determine the bandwidth priority based on one or more quality of service requirements.

6. The network compute device of claim 1, wherein the dynamic bandwidth allocation management circuitry is further configured to determine a trust score, and wherein to determine the bandwidth priority comprises to determine the bandwidth priority based at least in part on the determined trust score.

7. The network compute device of claim 6, wherein to determine the trust score comprises to determine (i) a contextual probability that the network compute device is configured to preserve priority associated with an application at risk, (ii) a level of risk associated with scheduling the compute device using the determined bandwidth priority, and (iii) a set of applications in compliance with a whitelist configuration known to be trustworthy.

8. The network compute device of claim 7, wherein to determine the trust score further comprises to determine the trust score as a function of one or more user parametrized constraints.

9. The network compute device of claim 6, further comprising a trusted execution environment, wherein to determine the trust score comprises to determine the trust score using the trusted execution environment.

10. The network compute device of claim 1, further comprising network traffic ingress/egress management circuitry configured to enforce the moderated bandwidth allocation policy to restrict network traffic bandwidth to the compute device based on the determined amount of bandwidth.

11. One or more machine-readable storage media comprising a plurality of instructions stored thereon that, in response to being executed, cause a network compute device to:
   collect context inputs from a plurality of compute devices communicatively coupled to the network compute device, wherein the context inputs are usable to identify a corresponding context of each compute device;
   identify a context of a compute device of the plurality of compute devices based on the collected context inputs, wherein the collected context inputs include environment data produced by one or more sensors of the compute device;
   determine a bandwidth priority for the compute device based on the identified context;
   determine an amount of bandwidth from a total available bandwidth to allocate to the compute device based on the determined bandwidth priority; and
   update a moderated bandwidth allocation policy to reflect the determined amount of bandwidth allocated to the compute device.

12. The one or more machine-readable storage media of claim 11, wherein to collect context inputs includes to collect resource usage data of one or more components of the compute device.

13. The one or more machine-readable storage media of claim 11, wherein to collect context inputs includes to collect one or more samples of network traffic transmitted to and received from the compute device, and wherein to identify the context of the compute device comprises to identify the context based on analysis of the collected samples.

14. The one or more machine-readable storage media of claim 11, wherein to determine the bandwidth priority comprises to determine the bandwidth priority relative to one or more previously determined bandwidth priorities of one or more other compute devices of the plurality of compute devices.

15. The one or more machine-readable storage media of claim 11, wherein to determine the bandwidth priority comprises to determine the bandwidth priority based on one or more quality of service requirements.

16. The one or more machine-readable storage media of claim 11, wherein the plurality of instructions further cause the network compute device to determine a trust score, and wherein to determine the bandwidth priority comprises to determine the bandwidth priority based at least in part on the determined trust score.

17. The one or more machine-readable storage media of claim 16, wherein to determine the trust score comprises to determine (i) a contextual probability that the network compute device is configured to preserve priority associated with an application at risk, (ii) a level of risk associated with scheduling the compute device using the determined bandwidth priority, and (iii) a set of applications in compliance with a whitelist configuration known to be trustworthy.

18. The one or more machine-readable storage media of claim 17, wherein to determine the trust score further comprises to determine the trust score as a function of one or more user parametrized constraints.

19. The one or more machine-readable storage media of claim 16, wherein to determine the trust score comprises to determine the trust score using a trusted execution environment of the network compute device.

20. The one or more machine-readable storage media of claim 11, wherein the plurality of instructions further cause the network compute device to enforce the moderated bandwidth allocation policy to restrict network traffic bandwidth to the compute device based on the determined amount of bandwidth.

21. A network compute device for context-aware dynamic bandwidth allocation, the network compute device comprising:
   circuitry for collecting context inputs from a plurality of compute devices communicatively coupled to the network compute device, wherein the context inputs are usable to identify a corresponding context of each compute device;
   means for identifying a context of a compute device of the plurality of compute devices based on the collected context inputs, wherein the collected context inputs include environment data produced by one or more sensors of the compute device;
   means for determining a bandwidth priority for the compute device based on the identified context;
   means for determining an amount of bandwidth from a total available bandwidth to allocate to the compute device based on the determined bandwidth priority; and
   means for updating a moderated bandwidth allocation policy to reflect the determined amount of bandwidth allocated to the compute device.

22. The network compute device of claim 1, further comprising means for determining a trust score, and wherein the means for determining the bandwidth priority comprises means for determining the bandwidth priority based at least in part on the determined trust score.

23. The network compute device of claim 22, wherein the means for determining the trust score comprises means for determining (i) a contextual probability that the network compute device is configured to preserve priority associated with an application at risk, (ii) a level of risk associated with scheduling the compute device using the determined bandwidth priority, and (iii) a set of applications in compliance with a whitelist configuration known to be trustworthy.

* * * * *